(12) United States Patent
Tamitsuji (10) Patent No.: US 10,715,063 B2
(45) Date of Patent: Jul. 14, 2020

(54) MOTOR DRIVE CONTROL DEVICE AND METHOD OF CONTROLLING MOTOR DRIVE CONTROL DEVICE

(71) Applicant: MINEBEA MITSUMI Inc., Nagano (JP)

(72) Inventor: Toshihiro Tamitsuji, Iwata (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 16/449,781

(22) Filed: Jun. 24, 2019

(65) Prior Publication Data

US 2020/0014315 A1 Jan. 9, 2020

(30) Foreign Application Priority Data

Jul. 3, 2018 (JP) .................. 2018-127014

(51) Int. Cl.
*H02P 6/06* (2006.01)
*H02P 6/30* (2016.01)
*H02P 6/26* (2016.01)
*H02P 6/12* (2006.01)

(52) U.S. Cl.
CPC ............. *H02P 6/30* (2016.02); *H02P 6/06* (2013.01); *H02P 6/12* (2013.01); *H02P 6/26* (2016.02)

(58) Field of Classification Search
CPC .................... H02P 6/26; H02P 6/30

USPC ...................................... 318/400.03
See application file for complete search history.

(56) References Cited

U.S. PATENT DOCUMENTS

| 4,338,551 | A | * | 7/1982 | Mizumoto | ............... H02P 6/28 318/400.26 |
| 5,146,147 | A | * | 9/1992 | Wills | ..................... H02P 1/44 318/797 |
| 2009/0153093 | A1 | * | 6/2009 | Pinewski | ................ H02P 8/36 318/696 |

FOREIGN PATENT DOCUMENTS

JP 2009-077543 A 4/2009

* cited by examiner

*Primary Examiner* — Erick D Glass
(74) *Attorney, Agent, or Firm* — Pearne & Gordon LLP (57) ABSTRACT

A motor drive control device for driving a single phase motor having a coil of a first system and a coil of a second system includes a first drive circuit configured to control energization to the coil of the first system, a second drive circuit configured to control energization to the coil of the second system, and an adjustment circuit to which a first monitor voltage output from the first drive circuit and a second monitor voltage output from the second drive circuit are input. One or both of the first and second drive circuits has at least one of an input terminal and an output terminal. The adjustment circuit performs an adjustment operation of applying a predetermined voltage to at least one of the input terminal and the output terminal based on the first and second monitor voltages.

9 Claims, 3 Drawing Sheets

| VOLTAGE SUPPLIED TO FIRST DRIVE CIRCUIT | High (NORMAL) | Low (ABNORMAL) | High (NORMAL) |
|---|---|---|---|
| VOLTAGE SUPPLIED TO SECOND DRIVE CIRCUIT | High (NORMAL) | High (NORMAL) | Low (ABNORMAL) |
| VOLTAGE TERMINAL 121 OF FIRST CONTROL CIRCUIT UNIT | 5V | 0V | 5V |
| VOLTAGE TERMINAL 121b OF SECOND CONTROL CIRCUIT UNIT | 5V | 5V | 0V |
| TRANSISTOR 22t | ON | OFF | ON |
| TRANSISTOR 23t | ON | ON | OFF |
| TRANSISTOR 24t | ON | OFF | OFF |
| POTENTIAL AT P1 | 0V | 5V | 5V |
| TRANSISTOR 28t | OFF | ON | ON |
| OUTPUT TERMINAL 125 | FG SIGNAL | Sa (FIXED Low) | Sa (FIXED Low) |
| ROTATIONAL SPEED SWITCH CIRCUIT (DIODE D1) | OFF | ON (CURRENT FLOWS) | ON (CURRENT FLOWS) |
| INPUT TERMINAL 123 OF FIRST CONTROL CIRCUIT UNIT | Sc | 5V | 5V |
| INPUT TERMINAL 123b OF SECOND CONTROL CIRCUIT UNIT | Sc | 5V | 5V |
| DRIVING BY FIRST DRIVE CIRCUIT | ROTATIONAL SPEED ACCORDING TO Sc | - | MAXIMUM ROTATIONAL SPEED |
| DRIVING BY SECOND DRIVE CIRCUIT | ROTATIONAL SPEED ACCORDING TO Sc | MAXIMUM ROTATIONAL SPEED | - |

FIG.3

MOTOR DRIVE CONTROL DEVICE AND METHOD OF CONTROLLING MOTOR DRIVE CONTROL DEVICE

CROSS REFERENCE TO RELATED APPLICATIONS

This application claims the benefit of Japanese Patent Application No. 2018-127014, filed Jul. 3, 2018, which is hereby incorporated by reference in its entirety.

BACKGROUND

Technical Field

The present disclosure relates to a motor drive control device and a method of controlling the motor drive control device, and more particularly relates to a motor drive control device having drive circuits of two systems, and a method of controlling such a motor drive control device.

BACKGROUND

Conventionally, there has been disclosed a motor drive device for driving a single phase motor (see, for example, Japanese Patent Application Laid-Open No. 2009-77543).

SUMMARY

Incidentally, there is a case where a drive circuit of a motor drive control device is broken and cannot drive a motor. For example, in an application where a motor is driven in a predetermined rotational direction (forward direction), when the motor cannot be driven as described above, if an external force is exerted and forcibly causes the motor to rotate in the opposite direction (reverse rotation) to the predetermined rotational direction, a problem may occur.

For example, in the case where a fan motor is driven by the motor drive control device, if the drive circuit of the motor drive control device is broken due to a blown fuse in a power supply line or the like, driving of the fan motor is stopped. In such a case, for example, when air flows into the fan motor due to the operation of another fan motor used in combination with the fan motor, the fan motor may rotate in the reverse direction. For example, in the case where a plurality of fan motors are used for cooling a device enclosed with a housing, when one fan motor reversely rotates as described above, the internal pressure in the device is decreased and the cooling function is deteriorated, which may possibly affect the function of the device. Therefore, it is necessary to continue the forward rotation of the fan motor as much as possible.

The present disclosure is related to providing a motor drive control device and a method of controlling the motor drive control device, capable of continuing the forward rotation of a motor as much as possible.

According to a first aspect of the present disclosure, a motor drive control device for driving a single phase motor having a coil of a first system and a coil of a second system is provided, and the motor drive control device includes: a first drive circuit configured to control energization to the coil of the first system; a second drive circuit configured to control energization to the coil of the second system; and an adjustment circuit to which a first monitor voltage output from the first drive circuit and a second monitor voltage output from the second drive circuit are input, wherein one or both of the first drive circuit and the second drive circuit has at least one of an input terminal to which a signal related to driving of the single phase motor is input and an output terminal from which a signal related to driving of the single phase motor is output, and the adjustment circuit performs an adjustment operation of applying a predetermined voltage to at least one of the input terminal and the output terminal based on the first monitor voltage and the second monitor voltage.

Preferably, the adjustment circuit includes an abnormality determination circuit configured to receive input of the first monitor voltage and the second monitor voltage and to output an adjustment signal when at least one of the first monitor voltage and the second monitor voltage is lower than a predetermined value, and an adjustment execution circuit configured to apply a predetermined voltage to at least one of the input terminal and the output terminal when the adjustment signal is output from the abnormality determination circuit.

Preferably, a speed command signal of a voltage corresponding to a rotational speed at which the single phase motor is driven is input to the input terminal, and the adjustment operation includes an operation of applying a voltage corresponding to a predetermined rotational speed to the input terminal.

According to another aspect of the present disclosure, in the motor drive control device, the output terminal is a terminal for outputting an FG signal corresponding to an actual rotational speed of the single phase motor, and the adjustment operation includes an operation of outputting an abnormality determination signal from the output terminal by applying a predetermined voltage to the output terminal.

Preferably, the abnormality determination signal is a signal in which a voltage is fixed at a low level, or a signal in which a voltage is fixed at a high level.

Preferably, each of the first drive circuit and the second drive circuit further includes a voltage blocking circuit for blocking application of a back electromotive force generated in the single phase motor.

Preferably, each of the first drive circuit and the second drive circuit further includes a reverse connection protection circuit for protecting a circuit when the motor drive control device is connected in reverse polarity to a power supply, and the reverse connection protection circuit includes the voltage blocking circuit.

Preferably, the first drive circuit includes a first energization circuit configured to energize the coil of the first system and a first control circuit unit configured to control the first energization circuit, the first control circuit unit being an integrated circuit, the second drive circuit includes a second energization circuit configured to energize the coil of the second system and a second control circuit unit configured to control the second energization circuit, the second control circuit unit being an integrated circuit, the first monitor voltage is output from a voltage terminal provided in the first control circuit unit and the second monitor voltage is output from a voltage terminal provided in the second control circuit unit.

According to still another aspect of the present disclosure, a method of controlling a motor drive control device for driving a single phase motor having a coil of a first system and a coil of a second system is provided, the motor drive control device including: a first drive circuit configured to control energization to the coil of the first system; and a second drive circuit configured to control energization to the coil of the second system, wherein one or both of the first drive circuit and the second drive circuit has at least one of an input terminal to which a signal related to driving of the single phase motor is input and an output terminal from which a signal related to driving of the single phase motor is output, the method including: a monitor voltage detection step of detecting a first monitor voltage and a second monitor voltage; and an adjustment step of applying a predetermined voltage to at least one of the input terminal and the output terminal based on a detection result in the monitor voltage detection step.

According to the disclosure, it is possible to provide the motor drive control device and the method of controlling the motor drive control device, capable of continuing the forward rotation of the motor as much as possible.

DETAILED DESCRIPTION

Hereinafter, a motor drive control device of an embodiment of the present disclosure will be described.

Embodiment

Figure 1:
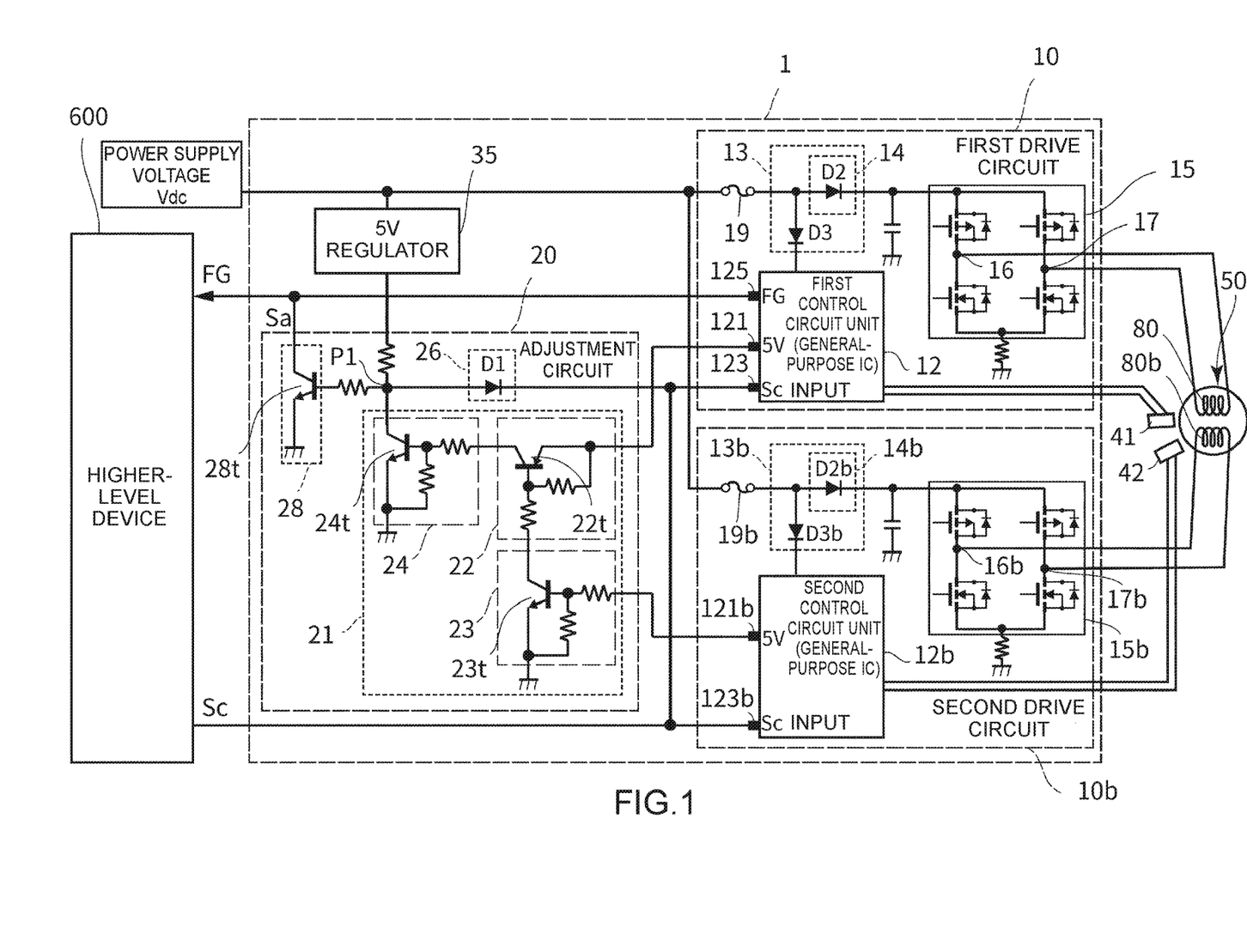
FIG. 1 is a view schematically showing the configuration of a motor drive control device of one embodiment of the present disclosure.

FIG. 1 is a view schematically showing the configuration of a motor drive control device 1 in one embodiment of the present disclosure.

As shown in FIG. 1, the motor drive control device 1 is used for a motor device having a motor 50. The motor device includes two position detectors 41, 42 that output position signals according to a rotational position of the motor 50. The motor drive control device 1 is supplied with a DC power supply voltage Vdc from the outside.

The motor drive control device 1 is connected to a higher-level device 600. A speed command signal Sc output from the higher-level device 600 is input to the motor drive control device 1. The motor drive control device 1 drives the motor 50 according to the input speed command signal Sc. An FG signal corresponding to the rotation of the motor 50 is output from the motor drive control device 1 to the higher-level device 600. Based on the FG signal output from the motor drive control device 1, the higher-level device 600 can ascertain the rotational state of the motor 50.

The motor 50 includes a coil 80 of a first system and a coil 80b of a second system, each coil being wound around teeth (not shown). Each of the coil 80 of the first system and the coil 80b of the second system may be composed of one coil.

In the present embodiment, the motor drive control device 1 includes a first drive circuit 10 configured to control energization to the coil 80 of the first system, a second drive circuit 10b configured to control energization to the coil 80b of the second system and an adjustment circuit 20. The first drive circuit 10 includes a first inverter circuit (one example of a first energization circuit) 15 configured to energize the coil 80 of the first system and a first control circuit unit 12 configured to control the first inverter circuit 15, the first control circuit unit 12 being an integrated circuit (IC). The second drive circuit 10b includes a second inverter circuit (one example of a second energization circuit) 15b configured to energize the coil 80b of the second system and a second control circuit unit 12b configured to control the second inverter circuit 15b, the second control circuit unit 12b being an integrated circuit (IC).

The first position detector 41 is connected to the first drive circuit 10. The second position detector 42 is connected to the second drive circuit 10b. The first position detector 41 is placed at a position corresponding to the coil 80 of the first system. The second position detector 42 is placed at a position corresponding to the coil 80b of the second system.

The two position detectors 41, 42 output position detection signals according to the position of a rotor of the motor 50. The first position detector 41 outputs the position detection signal to the first control circuit unit 12 included in the first drive circuit 10. The second position detector 42 outputs the position detection signal to the second control circuit unit 12b included in the second drive circuit 10b.

In the present embodiment, the first and second position detectors 41, 42 are Hall elements. Each of the Hall elements outputs a Hall signal which is a signal having positive or negative polarity, as a position detection signal. The first and second position detectors 41, 42 are not limited to mutually identical devices and are not limited to Hall elements.

In the present embodiment, the first drive circuit 10 and the second drive circuit 10b have the mutually identical circuit configuration, except that the first drive circuit 10 outputs the FG signal. Therefore, the configuration of the first drive circuit 10 will be described below, and this description also applies to the second drive circuit 10b.

The first drive circuit 10 has a fuse 19 with one end connected to the power supply voltage Vdc. Another end of the fuse 19 is connected to an anode of a diode D2 and an anode of a diode D3. The fuse 19 is connected to the first inverter circuit 15 through the diode D2. Further, the fuse 19 is connected to the first control circuit unit 12 through the diode D3.

In the first drive circuit 10, the power supply voltage Vdc is input through the fuse 19 to the first control circuit unit 12 and the first inverter circuit 15.

The first control circuit unit 12 is, for example, a general-purpose IC for driving a motor. The speed command signal Sc and the position detection signal output from the first position detector 41 are input to the first control circuit unit 12. The first control circuit unit 12 outputs an output signal for operating the first inverter circuit 15 based on the position detection signal, and controls the operation of the first inverter circuit 15. For example, the first control circuit unit 12 detects the actual rotational speed of the motor 50 based on the position detection signal, and controls the on/off operation of a switching device included in the first inverter circuit 15 so that the actual rotational speed of the motor 50 becomes a rotational speed corresponding to the input speed command.

The first inverter circuit 15 energizes the coil 80 of the first system included in the motor 50 based on the output signal output from the first control circuit unit 12. The output signal is, for example, a PWM (pulse width modulation) signal. The first inverter circuit 15 has, for example, two pairs of series circuits of two switching devices provided at both ends of the power supply voltage Vdc. In the pairs of two switching devices, the connection points between the switching devices are energization terminals 16, 17 configured to energize the coil 80 of the first system. By outputting an output signal corresponding to each switching device of the inverter circuit 15 from the first control circuit unit 12, the switching device corresponding to each output signal performs the on/off operation, and energization to the energization system of the coil 80 of the first system connected to the energization terminals 16, 17 is performed. The first control circuit unit 12 switches the direction of the current flowing through the coil 80 of the first system at the timing according to the input position detection signal.

Like the first drive circuit 10, the second drive circuit 10b includes a fuse 19b, a diode D2b, a diode D3b, and energization terminals 16b, 17b connected to the coil 80b of the second system. The second control circuit unit 12b switches the direction of the current flowing through the coil 80b of the second system at the timing according to the input position detection signal (second Hall signal).

In the first drive circuit 10, the first control circuit unit 12 outputs the FG signal according to the actual rotational speed of the motor 50. In this regard, in the second drive circuit 10b, the second control circuit unit 12b does not output an FG signal. The FG signal may be arranged to be output from the second control circuit unit 12b and not to be output from the first control circuit unit 12. Further, the FG signal may be a signal produced by combining FG signals output from the first control circuit unit 12 and the second control circuit unit 12b, respectively.

The first drive circuit 10 and the second drive circuit 10b include voltage blocking circuits 14 and 14b, respectively, for blocking application of a back electromotive force generated by the motor 50. In the present embodiment, the voltage blocking circuits 14 and 14b are configured by diodes D2 and D2b, respectively.

Moreover, the first drive circuit 10 and the second drive circuit 10b include reverse connection protection circuits 13 and 13b, respectively, for protecting the motor drive control device 1 when the motor drive control device 1 is connected in reverse polarity to the power supply voltage Vdc. In the present embodiment, the reverse connection protection circuits 13 and 13b include the voltage blocking circuits 14 and 14b, respectively. That is, the reverse connection protection circuit 13 is composed of the diode D2 and the diode D3, while the reverse connection protection circuit 13b is composed of the diode D2b and the diode D3b. The voltage blocking circuits 14, 14b and the reverse connection protection circuits 13, 13b may be configured using, for example, switching devices. Since the reverse connection protection circuits 13, 13b are configured using the parts of the voltage blocking circuits 14, 14b, the number of parts of the motor drive control device 1 as a whole can be decreased, and the production cost of the motor drive control device 1 can be reduced. The reverse connection protection circuits 13, 13b may be configured using, for example, P-channel field effect transistors (FET).

Here, the first drive circuit 10 and the second drive circuit 10b respectively have voltage terminals 121 and 121b. Moreover, the first drive circuit 10 and the second drive circuit 10b respectively have input terminals 123 and 123b to which signals related to driving of the motor 50 are input. Further, the first drive circuit 10 has an output terminal 125 from which a signal related to driving of the motor 50 is output.

The voltage terminal 121, the input terminal 123 and the output terminal 125 are provided in the first control circuit unit 12. The voltage terminal 121b and the input terminal 123b are provided in the second control circuit unit 12b.

In the present embodiment, the speed command signal Sc is input to the input terminals 123, 123b. That is, the speed command signal Sc output from the higher-level device 600 is branched into two and then input to the first control circuit unit 12 from the input terminal 123 and input to the second control circuit unit 12b from the input terminal 123b. The speed command signal Sc is a signal related to driving of the motor 50, and more specifically a signal of a voltage corresponding to the rotational speed (target rotational speed) at which the motor 50 is driven. For example, the speed command signal Sc is a PWM (pulse width modulation) signal of a duty according to the target rotational speed with a high level of 5 volts.

Further, the FG signal is output from the output terminal 125. The FG signal output from the output terminal 125 is output from the motor drive control device 1 and input to the higher-level device 600. The FG signal is a signal related to driving of the motor 50, and more specifically a signal in which the voltage repeats a high level and a low level at a frequency corresponding to the actual rotational speed of the motor 50.

From the voltage terminal 121, a first monitor voltage is output. From the voltage terminal 121b, a second monitor voltage is output. The voltage terminals 121, 121b are terminals which output a constant voltage, and are originally provided in the two control circuit units 12, 12b which are general-purpose ICs for driving a motor. When the two control circuit units 12, 12b are in operation, each of the voltage terminals 121, 121b outputs a constant voltage of, for example, 5 volts (or may be other voltage value such as 3.3 volts). It can be said that the first monitor voltage and the second monitor voltage are signals that become the voltage of a predetermined height when the two control circuit units 12, 12b, that is, the two drive circuits 10, 10b are in operation.

The first monitor voltage output from the first drive circuit 10 and the second monitor voltage output from the second drive circuit 10b are input to the adjustment circuit 20.

The adjustment circuit 20 is connected to the voltage terminals 121, 121b, the input terminals 123, 123b, and the output terminal 125. Further, the adjustment circuit 20 is connected to a regulator 35.

The regulator 35 generates a constant voltage based on the power supply voltage Vdc. The regulator 35 is configured using, for example, a Zener diode, but is not limited to this and may be, for example, a voltage dividing circuit that generates a constant voltage by dividing the power supply voltage Vdc. The regulator 35 outputs a constant voltage of, for example, 5 volts to the adjustment circuit 20. The voltage generated by the regulator 35 is not limited to 5 volts, and may be, for example, 3.3 volts. The voltage generated by the regulator 35 is set, for example, at a voltage that is treated as a high level in the two control circuit units 12, 12b, but is not limited to this.

In the present embodiment, the adjustment circuit 20 performs an adjustment operation of applying a predetermined voltage to the input terminals 123, 123b and the output terminal 125 based on the first monitor voltage and the second monitor voltage. That is, the adjustment circuit 20 is an electric circuit configured to detect the first monitor voltage and the second monitor voltage (a monitor voltage detection step), and perform an adjustment operation of applying a predetermined voltage to the input terminals 123, 123b and the output terminal 125 based on the detection results (an adjustment step).

The adjustment circuit 20 includes an abnormality determination circuit 21, a rotational speed switch circuit (one example of an adjustment execution circuit) 26, and an FG signal switch circuit (one example of an adjustment execution circuit) 28. The first monitor voltage and the second monitor voltage are input to the abnormality determination circuit 21. The abnormality determination circuit 21 is configured to output an adjustment signal when at least one of the first monitor voltage and the second monitor voltage is lower than a predetermined value. The rotational speed switch circuit 26 applies a predetermined voltage to the input terminals 123, 123b when the adjustment signal is output from the abnormality determination circuit 21. Moreover, when the adjustment signal is output from the abnormality determination circuit 21, the FG signal switch circuit 28 applies a predetermined voltage to the output terminal 125.

That is, as will be described below, the adjustment operation includes an operation of applying a voltage corresponding to a predetermined rotational speed to the input terminals 123, 123b. Further, the adjustment operation includes an operation of outputting an abnormality determination signal Sa from the output terminal 125 by applying a predetermined voltage to the output terminal 125. The abnormality determination signal Sa is a signal in which a voltage is fixed at a low level. It should be noted that the abnormality determination signal may be a signal in which a voltage is fixed at a high level.

The regulator 35 is connected to a point P1 in the adjustment circuit 20 through a resistor. The point P1 is connected to the rotational speed switch circuit 26. The rotational speed switch circuit 26 is connected to the input terminals 123, 123b. Moreover, the point P1 is connected to the FG signal switch circuit 28 through a resistor. The FG signal switch circuit 28 is connected to the output terminal 125. The abnormality determination circuit 21 is connected to the point P1. Further, the abnormality determination circuit 21 is connected to the voltage terminals 121, 121b.

The rotational speed switch circuit 26 has, for example, a diode D1. The anode of the diode D1 is connected to the point P1 and the cathode of the diode D1 is connected to the input terminals 123, 123b. The input terminals 123, 123b are connected to the higher-level device 600 and the speed command signal Sc is input to the input terminals 123, 123b. Since the diode D1 is provided, the speed command signal Sc is not input into the adjustment circuit 20.

The FG signal switch circuit 28 has a transistor 28t. The base of the transistor 28t is connected to the point P1 through a resistor and the emitter of the transistor 28t is connected to the ground potential. The collector of the transistor 28t is connected to the output terminal 125. That is, the collector of the transistor 28t is connected to a terminal of the higher-level device 600 and the FG signal is input to the terminal.

The abnormality determination circuit 21 includes a first switch circuit 22, a second switch circuit 23 and a third switch circuit 24. The switch circuits 22, 23, 24 are composed of transistors 22t, 23t, 24t, and resistors.

The first switch circuit 22 has the transistor 22t with the emitter connected to the voltage terminal 121. The emitter and the base of the transistor 22t are connected by the resistor. The base of the transistor 22t is connected to the second switch circuit 23 through the resistor. The collector of the transistor 22t is connected to the third switch circuit 24.

The second switch circuit 23 has the transistor 23t with the base connected to the voltage terminal 121b through the resistor. The emitter and the base of the transistor 23t are connected by the resistor. The emitter of the transistor 23t is connected to the ground potential. The collector of the transistor 23t is connected to the first switch circuit 22. That is, the collector of the transistor 23t is connected to the base of the transistor 22t through the resistor.

The third switch circuit 24 has the transistor 24t with the base connected to the first switch circuit 22 through the resistor. The emitter and the base of the transistor 24t are connected by the resistor. The emitter of the transistor 24t is connected to the ground potential. The collector of the transistor 23t is connected to the point P1.

The abnormality determination circuit 21 outputs an adjustment signal from the collector of the transistor 24t according to whether or not both the first monitor voltage and the second monitor voltage are equal to or higher than a predetermined value. That is, when both of the first monitor voltage and the second monitor voltage are equal to or higher than the predetermined value, the transistor 24t is in the on state, and the voltage at the point P1 becomes 0 volts. When at least one of the first monitor voltage and the second monitor voltage is lower than the predetermined value, the transistor 24t is in the off state. Consequently, the voltage at the point P1 is a predetermined voltage (for example, approximately 5 volts) given by dividing the output voltage from the regulator 35 by the resistor. Thus, it can be said that the adjustment signal is a signal that switches between the predetermined voltage and the ground potential according to the first monitor voltage and the second monitor voltage.

Here, the predetermined value refers to a voltage value that is sufficient to turn on the transistors 22t, 23t. That is, the predetermined value may be a value which varies appropriately depending on the transistors 22t, 23t and the resistors used in the first switch circuit 22 and the second switch circuit 23.

Figure 2:
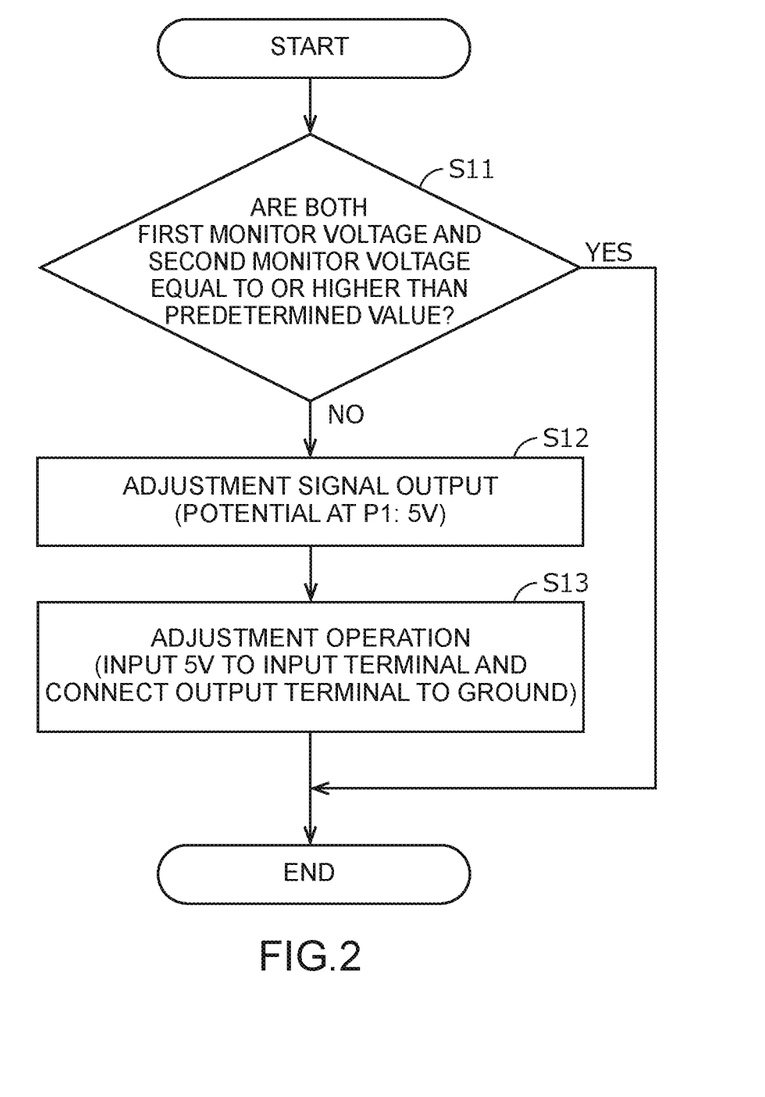
FIG. 2 is a flowchart explaining an operation performed by an adjustment circuit.

FIG. 2 is a flowchart explaining the operation performed by the adjustment circuit 20.

The adjustment circuit 20 can perform the following operation by having the circuit configuration as described above. It can be said that the following operation is repeated when the motor drive control device 1 is supplied with power.

That is, in step S11, the adjustment circuit 20 determines whether or not both the first monitor voltage and the second monitor voltage are equal to or higher than a predetermined value. If at least one of the voltages is lower than the predetermined value (NO), the operation proceeds to step S12. If both the first monitor voltage and the second monitor voltage are equal to or higher than the predetermined value (YES), the processes in steps S12 and S13 are not performed, and the operation is ended.

In step S12, the adjustment circuit 20 outputs an adjustment signal from the abnormality determination circuit 21. That is, the potential at the point P1 becomes the predetermined voltage from the ground potential.

In step S13, the adjustment circuit 20 performs the adjustment operation. That is, the rotational speed switch circuit 26 performs an operation of applying a voltage corresponding to a predetermined rotational speed to the input terminals 123, 123b. Further, the FG signal switch circuit 28 performs an operation of connecting the output terminal 125 to the ground potential. That is, an operation of outputting the abnormality determination signal Sa in which the voltage is fixed at a low level from the output terminal 125 is performed.

By performing such an adjustment operation, the motor drive control device 1 as a whole performs the operation as follows.

Figure 3:
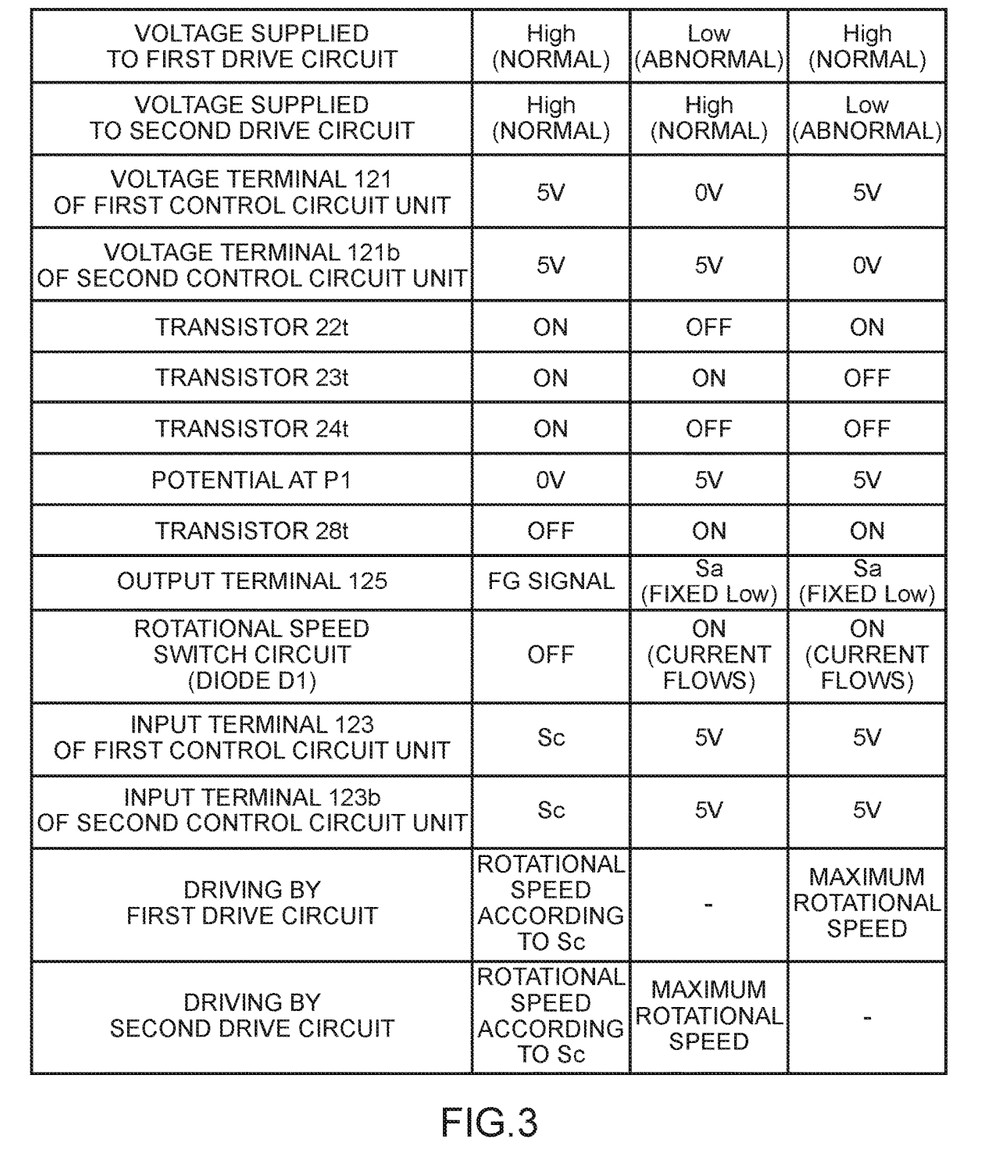
FIG. 3 is a table for explaining an operation of the motor drive control device.

FIG. 3 is a table for explaining the operation of the motor drive control device 1.

FIG. 3 shows the state of each of the parts of motor drive control device 1 in the following three cases regarding the drive voltage supplied to the first drive circuit 10 and the drive voltage supplied to the second drive circuit 10b. That is, the three cases shown are: the case where the drive voltage of the first drive circuit 10 and the drive voltage of the second drive circuit 10b are both normal (the second column from the left); the case where the drive voltage of the first drive circuit 10 is abnormal and the drive voltage of the second drive circuit 10b is normal (the third column from the left); and the case where the drive voltage of the first drive circuit 10 is normal and the drive voltage of the second drive circuit 10b is abnormal (the fourth column from the left).

As shown in the second column from the left in FIG. 3, in the case where both the drive voltage of the first drive circuit 10 and the drive voltage of the second drive circuit 10b are normal, both the voltage at the voltage terminal 121 of the first control circuit unit 12 and the voltage at the voltage terminal 121b of the second control circuit unit 12b have a voltage value (for example, 5 volts) equal to or higher than the predetermined value, which is a normal value. That is, the first monitor voltage is 5 volts and the transistor 22t of the first switch circuit 22 is in the on state. The second monitor voltage is 5 volts and the transistor 23t of the second switch circuit 23 is in the on state. Consequently, since the transistor 24t of the third switch circuit 24 is in the on state, the potential at the point P1 is ground potential.

Thus, when both the first monitor voltage and the second monitor voltage have a voltage value equal to or higher than the predetermined value, which is a normal value, the potential at the point P1 is ground potential, and therefore, the transistor 28t of the FG signal switch circuit 28 is in the off state. Thus, the signal output from the output terminal 125 is the FG signal. The higher-level device 600 can ascertain the rotational state of the motor 50 based on the input FG signal.

Further, since the potential at the point P1 is ground potential, the rotational speed switch circuit 26 is in the off state (no current flows). That is, the speed command signal Sc output from the higher-level device 600 is input to each of the input terminal 123 of the first control circuit unit 12 and the input terminal 123b of the second control circuit unit 12b. Therefore, driving based on the speed command signal Sc is performed by the first drive circuit 10 and driving based on the speed command signal Sc is performed by the second drive circuit 10b, and thus the motor 50 is driven at a rotational speed corresponding to the speed command signal Sc.

As shown in the third column from the left in FIG. 3, in the case where the drive voltage of the first drive circuit 10 is an abnormal value (a low level voltage value less than the predetermined value) and the drive voltage of the second drive circuit 10b is a normal value (a high level voltage value equal to or higher than the predetermined value), the voltage at the voltage terminal 121 is, for example, 0 volts and the voltage at the voltage terminal 121b is 5 volts. That is, the first monitor voltage is 0 volts and the transistor 22t of the first switch circuit 22 is in the off state. On the other hand, the second monitor voltage is 5 volts and the transistor 23t of the second switch circuit 23 is in the on state. Consequently, since the transistor 24t of the third switch circuit 24 is in the off state, the potential at the point P1 becomes the predetermined voltage, that is, 5 volts, based on the voltage output from the regulator 35. That is, the abnormality determination circuit 21 outputs an adjustment signal of a voltage of 5 volts. Thus, when the potential at the point P1 is 5 volts which is equal to or higher than the predetermined potential, the transistor 28t of the FG signal switch circuit 28 is in the on state.

At this time, since the voltage blocking circuit 14 is provided in the first drive circuit 10, the back electromotive force generated by the motor 50 will never be applied to the first control circuit unit 12. Hence, it is possible to prevent an oversight of an abnormal state of the first drive circuit 10 which could occur when the first control circuit unit 12 operates due to the back electromotive force and the first monitor voltage becomes 5 volts (a voltage value equal to or higher than the predetermined value) even though the drive voltage is not applied normally to the first control circuit unit 12.

Thus, when the transistor 28t of the FG signal switch circuit 28 is turned on, the output terminal 125 is connected to the ground potential (the ground potential is applied to the output terminal 125). That is, in this case, the output terminal 125 outputs to the higher-level device 600 the abnormality determination signal Sa in which the voltage is fixed at a low level. Since the abnormality determination signal Sa is input instead of the FG signal, the higher-level device 600 can ascertain that one of the two drive circuits 10, 10b in the motor drive control device 1 is in an abnormal state.

When the potential at the point P1 is 5 volts, the rotational speed switch circuit 26 is in the on state (current flows). That is, a voltage of 5 volts is applied to each of the input terminal 123 and the input terminal 123b based on the potential at the point P1. In this case, regardless of the duty of the speed command signal Sc output from the higher-level device 600, the voltage with a duty of 100% is input to each of the input terminal 123 and the input terminal 123b. Consequently, the energization to the coil 80b of the second system is performed in the same manner as in the case where the motor 50 is driven at the maximum rotational speed based on the voltage input to the input terminal 123b by the second drive circuit 10b to which the drive voltage is supplied normally. Thus, regardless of the duty of the speed command signal Sc output from the higher-level device 600, the second drive circuit 10b can apply the largest possible driving force to the motor 50. As a result, even if abnormality occurs in the first drive circuit 10 and driving of the first drive circuit 10 is stopped, it is possible to continue the forward rotation of the motor 50 as much as possible by the second drive circuit 10b.

As shown in the fourth column from the left in FIG. 3, in the case where the drive voltage of the first drive circuit 10 is a normal value (a high level voltage value equal to or higher than the predetermined value) and the drive voltage of the second drive circuit 10b is an abnormal value (a low level voltage value less than the predetermined value), the voltage at the voltage terminal 121 is 5 volts and the voltage at the voltage terminal 121b is, for example, 0 volts. That is, the first monitor voltage is 5 volts and the transistor 22t of the first switch circuit 22 is in the on state. On the other hand, the second monitor voltage is 0 volts and the transistor 23t of the second switch circuit 23 is in the off state. Consequently, since the transistor 24t of the third switch circuit 24 is in the off state, the potential at the point P1 becomes the predetermined voltage, that is, 5 volts, based on the voltage output from the regulator 35. That is, the abnormality determination circuit 21 outputs an adjustment signal of a voltage of 5 volts. Thus, when the potential at the point P1 is 5 volts which is equal to or higher than the predetermined potential, the transistor 28t of the FG signal switch circuit 28 is in the on state.

At this time, since the voltage blocking circuit 14b is provided in the second drive circuit 10b, the back electromotive force generated by the motor 50 will never be applied to the second control circuit unit 12b. Therefore, it is possible to prevent an oversight of an abnormal state of the second drive circuit 10b which is possibly caused if the second control circuit unit 12b operates due to the back electromotive force and the second monitor voltage becomes 5 volts (a voltage value equal to or higher than the predetermined value) even though the drive voltage is not applied normally to the second control circuit unit 12b.

Thus, when the transistor 28t of the FG signal switch circuit 28 is in the on state, the output terminal 125 is connected to the ground potential. That is, in this case, the output terminal 125 outputs to the higher-level device 600 the abnormality determination signal Sa in which the voltage is fixed at a low level. Since the abnormality determination signal Sa is input instead of the FG signal, the higher-level device 600 can ascertain that one of the two drive circuits 10, 10b in the motor drive control device 1 is in an abnormal state.

Moreover, when the potential at the point P1 is 5 volts, the rotational speed switch circuit 26 is in the on state (current flows). That is, a voltage of 5 volts is applied to each of the input terminal 123 and the input terminal 123b based on the potential at the point P1. In this case, regardless of the duty of the speed command signal Sc output from the higher-level device 600, the voltage with a duty of 100% is input to each of the input terminal 123 and the input terminal 123b. Consequently, the energization to the coil 80 of the first system is performed in the same manner as in the case where the motor 50 is driven at the maximum rotational speed based on the voltage input to the input terminal 123, by the first drive circuit 10 to which the drive voltage is supplied normally. Thus, regardless of the duty of the speed command signal Sc output from the higher-level device 600, the largest possible driving force is applied to the motor 50 by the first drive circuit 10. As a result, even if an abnormality occurs in the second drive circuit 10b and driving of the second drive circuit 10b is stopped, it is possible to continue the forward rotation of the motor 50 as much as possible by the first drive circuit 10.

As described above, in the present embodiment, even if driving is stopped due to a blown fuse 19, 19b or a breakage in either the first drive circuit 10 or the second drive circuit 10b, it is possible to continue to drive the motor 50 only by the other drive circuit. Hence, for example, when an external load is applied to the motor 50, even if one of the two drive circuits 10, 10b is stopped, the rotational torque of the motor 50 can be produced, and therefore, the forward rotation of the motor 50 can continue as much as possible (continue to resist the external load). A stronger torque can be produced than that when short braking is applied to the motor 50.

For example, in the case where a motor device is used as one of a plurality of fan motors used for ventilating the inside of the device, even if one of the two drive circuits 10, 10b is stopped, it is possible to resist the pressure difference between the inside and outside of the device. Thus, it is possible to prevent a reverse rotation of the motor 50 due to the pressure difference between the inside and outside of the device, and to prevent occurrence of a problem of deterioration of ventilation ability.

In the present embodiment, it can be said that the adjustment circuit 20 is configured to perform an operation of determining whether or not an abnormality has occurred in each of the first drive circuit 10 and the second drive circuit 10b. When the adjustment circuit 20 determines that one of the drive circuits 10, 10b is in an abnormal state, the adjustment circuit 20 performs an adjustment operation of applying a voltage to the input terminal 123, 123b so that the rotational speed becomes the maximum rotational speed (MAX) in the normal drive circuit, thereby continuing the rotation of the motor 50. Hence, even if an abnormality occurs in one drive circuit due to a blown fuse 19, 19b or other reasons, it is possible to compensate for a decrease of the driving force of the motor 50 as much as possible. Thus, the above-described effect can be more reliably obtained.

The adjustment circuit 20 is a simple electric circuit formed only with transistors and resistors. Therefore, the manufacturing cost of the motor drive control device 1 can be reduced compared to the case where a similar operation is realized using, for example, an expensive microcomputer or the like.

The adjustment circuit 20 causes the abnormality determination signal Sa to be output from the output terminal 125, instead of the FG signal, when an abnormality occurs in either the first drive circuit 10 or the second drive circuit 10b. Based on the abnormality determination signal Sa, the higher-level device 600 can ascertain that an abnormality has occurred in either the first drive circuit 10 or the second drive circuit 10b. Since the abnormality determination signal Sa is output from the output terminal 125 which outputs the FG signal in the steady state, it is not necessary to separately provide an exclusive signal line or the like, and it is possible to simplify the configuration of the motor drive control device 1.

In addition, as the first drive circuit 10 and the second drive circuit 10b, it is possible to use the same circuit configuration that performs the same operation based on the position detection signals from the two position detectors 41, 42. Hence, the motor drive control device 1 for energizing the coils 80, 80b of two systems can be simply configured. By energizing each of the coils 80, 80b of two systems with appropriate timings, driving can be efficiently performed.

In the above-described embodiment, energization to either of the first control circuit unit 12 of the first drive circuit 10 and the second control circuit unit 12b of the second drive circuit 10b may be performed with a timing shifted by a predetermined time from an energization timing based on the input position detection signal (a timing shifted by a predetermined angle in the electrical angle). In this case, the position detection signal output from one position detector can be shared by the two drive circuits 10, 10b, thereby enabling a decrease in the number of the position detectors.

[Others]

The circuit configuration of the motor drive control device is not limited to the specific examples as shown in the above-described embodiment or the modifications. Partly modified configurations of individual configurations of the above-described embodiment and the modifications may be appropriately combined or partly replaced to fit the purpose of the present disclosure. Moreover, some components or functions in the above-described embodiment may be omitted. In addition, various circuit configurations configured to meet the purpose of the present disclosure can be applied.

For example, in the above-described embodiment, the diodes D3, D3b included in the drive circuits 10, 10b may not necessarily be provided. In the case of providing reverse connection protection, one diode may be placed on the power supply voltage Vdc side rather than in the two drive circuits 10, 10b, and, in this case, the number of parts can be reduced.

A motor to be driven by the motor drive control device of the present embodiment is not limited to the motor described in the above embodiment.

The abnormality determination circuit may be configured using a field effect transistor (FET) or the like. The abnormality determination circuit may also be configured using a comparator.

A signal to be input to the input terminal is not limited to the speed command signal and may be another signal related to driving of the motor. That is, another instruction signal for giving an instruction regarding driving of the motor, such as setting of an operation mode, may be input to the input terminal. The output terminal may be included in the second drive circuit 10b, or may be included in both the first drive circuit and the second drive circuit. A signal to be output from the output terminal is not limited to the FG signal and may be another signal related to driving of the motor. That is, another signal corresponding to the driving state of the motor may be output from the output terminal. At least one of the input terminal and the output terminal may be provided. For example, in the case where only the output terminal is provided, when an abnormality determination signal is output from the output terminal and input to the higher-level device, and then it is found that one of the two drive circuits is in an abnormal state, the higher-level device increases the rotational speed of the motor by increasing the power supply voltage or the like, thereby making it possible to continue the forward rotation of the motor as much as possible.

Further, the adjustment operation may be any operation that applies a predetermined voltage to at least one of the input terminal and the output terminal.

The control circuit unit of each drive circuit unit is not limited to a general purpose IC.

The number of the position detectors is not limited to two. More position detectors may be used. The detection of the rotational position of the motor is not limited to the method using a Hall sensor.

In the above embodiment, the adjustment circuit is described as the circuit which, when one of the two drive circuits is in an abnormal state, performs control so that the rotational speed of the normal drive circuit becomes the maximum rotational speed, but the rotational speed of the normal drive circuit at this time is not limited to the maximum rotational speed. Control may be performed so that the rotational speed of the normal drive circuit is a rotational speed that maintains the forward rotation of the motor.

The above embodiment is to be construed in all aspects as illustrative and not restrictive. It is intended that the scope of the present disclosure be indicated not by the above description but by the claims, and includes all changes within the meaning and scope equivalent to the scope of claims.

What is claimed is:

1. A motor drive control device for driving a single phase motor having a coil of a first system and a coil of a second system, the motor drive control device comprising:
   a first drive circuit configured to control energization to the coil of the first system;
   a second drive circuit configured to control energization to the coil of the second system; and
   an adjustment circuit to which a first monitor voltage output from the first drive circuit and a second monitor voltage output from the second drive circuit are input, wherein
   one or both of the first drive circuit and the second drive circuit has at least one of an input terminal to which a signal related to driving of the single phase motor is input and an output terminal from which a signal related to driving of the single phase motor is output, and
   the adjustment circuit performs an adjustment operation of applying a predetermined voltage to at least one of the input terminal and the output terminal based on the first monitor voltage and the second monitor voltage.

2. The motor drive control device according to claim 1, wherein the adjustment circuit includes:
   an abnormality determination circuit configured to receive input of the first monitor voltage and the second monitor voltage and to output an adjustment signal when at least one of the first monitor voltage and the second monitor voltage is lower than a predetermined value; and
   an adjustment execution circuit configured to apply a predetermined voltage to at least one of the input terminal and the output terminal when the adjustment signal is output from the abnormality determination circuit.

3. The motor drive control device according to claim 1, wherein
   a speed command signal of a voltage corresponding to a rotational speed at which the single phase motor is driven is input to the input terminal, and
   the adjustment operation includes an operation of applying a voltage corresponding to a predetermined rotational speed to the input terminal.

4. The motor drive control device according to claim 1, wherein
   the output terminal is a terminal for outputting an FG signal corresponding to an actual rotational speed of the single phase motor, and
   the adjustment operation includes an operation of outputting an abnormality determination signal from the output terminal by applying a predetermined voltage to the output terminal.

5. The motor drive control device according to claim 4, wherein
   the abnormality determination signal is a signal in which a voltage is fixed at a low level or a signal in which a voltage is fixed at a high level.

6. The motor drive control device according to claim 1, wherein
   each of the first drive circuit and the second drive circuit further includes a voltage blocking circuit for blocking application of a back electromotive force generated in the single phase motor.

7. The motor drive control device according to claim 6, wherein
   each of the first drive circuit and the second drive circuit further includes a reverse connection protection circuit for protecting a circuit when the motor drive control device is connected in reverse polarity to a power supply, and
   the reverse connection protection circuit includes the voltage blocking circuit.

8. The motor drive control device according to claim 1, wherein
   the first drive circuit includes a first energization circuit configured to energize the coil of the first system and a first control circuit unit configured to control the first energization circuit, the first control circuit unit being an integrated circuit,
   the second drive circuit includes a second energization circuit configured to energize the coil of the second system and a second control circuit unit configured to control the second energization circuit, the second control circuit unit being an integrated circuit,
   the first monitor voltage is output from a voltage terminal provided in the first control circuit unit, and the second monitor voltage is output from a voltage terminal provided in the second control circuit unit.

9. A method of controlling a motor drive control device for driving a single phase motor having a coil of a first system and a coil of a second system,
the motor drive control device comprising:
a first drive circuit configured to control energization to the coil of the first system; and
a second drive circuit configured to control energization to the coil of the second system, wherein
one or both of the first drive circuit and the second drive circuit has at least one of an input terminal to which a signal related to driving of the single phase motor is input and an output terminal from which a signal related to driving of the single phase motor is output,
the method comprising:
a monitor voltage detection step of detecting a first monitor voltage and a second monitor voltage; and
an adjustment step of applying a predetermined voltage to at least one of the input terminal and the output terminal based on a detection result in the monitor voltage detection step.

* * * * *